(12) United States Patent
Blatchley et al.

(10) Patent No.: US 10,318,974 B2
(45) Date of Patent: Jun. 11, 2019

(54) TRACKING, MANAGING, SUGGESTING AND CONFIRMING RECEIPT OF GIFTS

(75) Inventors: Robert D. Blatchley, Longmont, CO (US); Jurij M. Deputat, Longmont, CO (US); Donald P. Taylor, III, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 588 days.

(21) Appl. No.: 13/545,703

(22) Filed: Jul. 10, 2012

(65) Prior Publication Data
US 2014/0019238 A1   Jan. 16, 2014

(51) Int. Cl.
G06Q 30/02       (2012.01)
G06Q 30/06       (2012.01)

(52) U.S. Cl.
CPC ..... G06Q 30/0207 (2013.01); G06Q 30/0601 (2013.01); G06Q 30/0633 (2013.01)

(58) Field of Classification Search
CPC ........... G06Q 30/0633; G06Q 30/0601; G06Q 30/0207
USPC ...................................................... 705/26.8
See application file for complete search history.

(56) References Cited

U.S. PATENT DOCUMENTS

| | | | | |
|---|---|---|---|---|
| 6,633,849 | B1 * | 10/2003 | Dodd | 705/26.35 |
| 7,512,552 | B2 | 3/2009 | Karas et al. | |
| 8,036,944 | B2 | 10/2011 | Lee et al. | |
| 2008/0228597 | A1 | 9/2008 | Sondles | |
| 2008/0301000 | A1 | 12/2008 | Roch | |
| 2009/0024530 | A1 * | 1/2009 | Porter | G06Q 30/00 705/50 |
| 2009/0327121 | A1 * | 12/2009 | Carroll et al. | 705/39 |
| 2009/0327129 | A1 * | 12/2009 | Collas et al. | 705/41 |
| 2010/0017278 | A1 * | 1/2010 | Wilen | B42D 15/045 705/14.2 |
| 2010/0280879 | A1 * | 11/2010 | O'Sullivan et al. | 705/10 |
| 2010/0280913 | A1 * | 11/2010 | O'Sullivan et al. | 705/26 |
| 2011/0320348 | A1 | 12/2011 | Kaneuchi | |

(Continued)

OTHER PUBLICATIONS

Anonymous, Evite.com Introduces a Social Event Planning Service to Help with Consumers' Party Planning Needs, from Appetizers to Invitations, Jan. 31, 2006, PR Newswire, NA.*

(Continued)

*Primary Examiner* — Jason B Dunham
*Assistant Examiner* — Brittany E Bargeon
(74) *Attorney, Agent, or Firm* — Schmeiser, Olsen & Watts, LLP; Michael Petrocelli

(57) ABSTRACT

A method and associated apparatus is provided where information about a gift from a recipient of the gift is received at a computer system. A numerical rating of the gift is received, and the numerical rating of the gift is inserted into an acknowledgment of the gift and sent to the sender. An advertisement is received from a service of an advertiser, and the numerical rating was used in selection of the advertisement. The received advertisement is denoted as an optimal advertisement that is presented to the recipient. The optimal advertisement includes a link to a web page for ordering an item identified in the web page. An order of the item placed via the web page is received from the recipient. The item ordered by the recipient and an identification of the item is sent, to the sender, as a reciprocal gift for the sender from the recipient.

6 Claims, 7 Drawing Sheets

(56) References Cited

U.S. PATENT DOCUMENTS

| | | | |
|---|---|---|---|
| 2012/0158516 A1* | 6/2012 | Wooten, III | G06Q 30/0269 705/14.66 |
| 2012/0181330 A1* | 7/2012 | Kim | G06O 30/02 235/375 |
| 2012/0209748 A1* | 8/2012 | Small | G06Q 30/06 705/27.1 |
| 2013/0117150 A1* | 5/2013 | Aliaga et al. | 705/26.8 |
| 2013/0246136 A1* | 9/2013 | Ramsey et al. | 705/14.12 |
| 2013/0268391 A1* | 10/2013 | Esch et al. | 705/26.7 |
| 2013/0346337 A1* | 12/2013 | O'Donnell et al. | 705/333 |
| 2014/0258055 A1* | 9/2014 | Wolfe et al. | 705/30 |

OTHER PUBLICATIONS

Anonymous, Evite.com Introduces a Social Event Planning Service to Help with Consumers' Party Planning Needs, from Appetizers to Invitations, Jan. 31, 2006, PR Newswire, p. 2. (Year: 2006).*
QR Code 'Voice' Gift Tags, www.qrcartist.com, 2 pages.
From Wikipedia, Application-specific integrated circuit, retrieved on Jul. 31, 2017 from the Internet: <URL: https://en.wikipedia.org/wiki/Application-specific_integrated_circuit>, 1 page.
Wikipedia; Application-specific integrated circuit; https://en.wikipedia.org/wiki/Application-specific_integrated_circuit; retrieved from the Internet May 4, 2018; 7 pages.
Webopedia; ASIC—Application-Specific Integrated Circuit; https://www.webopedia.com/TERM/A/ASIC.html; retrieved from the Internet 050/40/2018; 4 pages.
Techopedia; Application-Specific Integrated Circuit (ASIC); https://techopedia.com/definition/2357/application-specific-intergated-circuit-asic; retrieved from the Internet May 4, 2018; 4 pages.

* cited by examiner

TRACKING, MANAGING, SUGGESTING AND CONFIRMING RECEIPT OF GIFTS

BACKGROUND

1. Field

The disclosure relates generally to data processing systems and in particular, to using services to manage gifts. Still more particularly, the present disclosure relates to a method, apparatus, and computer program product services for suggesting, ordering, tracking, and confirming receipt of gifts.

2. Description of the Related Art

The Internet is a global system of computer networks that are connected to each other. These networks may be private, public, government, and/or other types of networks. The Internet is used to provide various services and content to users. For example, many users may visit websites to obtain information, download files, purchase goods and services, make financial transactions, and perform other operations.

Vendors put up websites on the Internet to provide and sell their products and services. Each vendor web site seeks the attention of the buying public. However, getting the attention of the buying public can be expensive and difficult to achieve. Users may be unaware of the existence of the vendor or unaware of the types of products and services sold by the vendor. One solution is to employ advertising to grab the attention of the user. But full advertising campaigns can be expensive and miss the intended audience. Another solution is for vendors to sell through an Internet based retailer who in turn sells products from many vendors. But selling through an Internet based retailer may be unacceptable to the vendor. A vendor may be, for example, a retailer, a non-profit organization, a government entity, or some other suitable type of vendor. Therefore, it would be beneficial for vendors to find other ways to make users aware of the products and services they have for sale.

When a user buys a product or service, on many occasions the purchase is for a gift. It is often difficult for those giving gifts to pick out a gift that will be well received. One solution to this problem is to provide a way for users to make and browse recommendations of vendor products and services on a web site. However, the recommendations made on web sites are likely made from persons unknown to the gift sender and gift receiver. As a result, the recommendations on web sites may not be as reliable as desired. Another solution to this problem would be for the gift givers and gift receivers to create manual records of gifts and logs of comments made by gift receivers regarding received gifts. However, creating records of gifts sent and logs of comments by gift receivers would be difficult and time consuming tasks for both gift givers and gift receivers. Further, records of gifts sent to a particular gift receiver and logs of comments from the gift receiver may not be readily available for use by a particular gift giver when the gift giver is making gift selections for the gift receiver.

Additionally, when purchasing a gift it can be difficult to determine approximately how much to spend. For example, when giving gifts some gift givers would prefer to spend an amount approximate to the amount spent on them by the person they are giving the gift to. As another example, some gift givers would prefer to select gifts that are based on remaining within an overall budget for sending gifts.

Because of the amount of research required, the number of possible products and services, the number of gifts being sent, and budgeting issues selecting gifts can take more time than desired. Therefore, it would be beneficial to speed up the process of selecting gifts.

Further, when receiving gifts it may be desirable for the gift receiver to send a thank you note to the gift giver. For example, the gift may be for a birthday, Christmas, wedding, baby shower, or for some other occasion where it is customary to respond with a thank you note. A thank you note has a number of purposes. The thank you note allows the recipient to thank the gift giver for the gift. The thank you note can also inform the gift giver that the gift was received and/or opened. Further, the thank you note can acknowledge aspects of the gift, an opinion of gift by the gift receiver, a purpose or use of the gift by the gift receiver, the occasion for which the gift was received, a request for communication between the gift giver and gift receiver, and other communications between the gift receiver and gift giver.

Traditional paper thank you notes are sent via a postal mail carrier to the gift giver. The process of preparing and sending a thank you note by paper can be a time consuming task. Sending a paper thank you note may be subject to delay and unnecessary expense due to required purchase of a card and postage. Further, a gift receiver may forget whether they have already sent a thank you note for a particular gift. Still further, in many cases, a gift receiver does not know, or does not conveniently have at hand the mailing address of the gift giver.

Therefore, it would be beneficial to have a method, apparatus, and computer program product that takes into account at least some of the issues discussed above, as well as possibly other issues.

SUMMARY

A method and associated apparatus is provided Information about a gift from a recipient of the gift is received by a computer system via a web communication network, wherein the information about the gift is within a barcode included on or in a package in which the gift is sent to the recipient, wherein the received information about the gift results from a scan of the barcode by a portable computing device of the computer system, wherein the information about the gift identifies the gift as being given by a sender to the recipient and identifies types of media desired by the sender for receiving acknowledgement of gifts. After the information about the gift is received, the information about the gift is stored, by the computer system, in a stored history of information about gifts previously received by the recipient, wherein the stored history is stored in the computer system. After the information about the gift is stored, advertising for the recipient from the stored history of information about gifts received by the recipient is identified by the computer system. After advertising for the recipient is identified, the advertising to the recipient is presented by the computer system via the web communication network. A numerical rating of the gift is received, by the computer system via the web communication network, wherein the numerical rating of the gift was selected by the recipient via a rating selection region in a graphical user interface (GUI) that displayed the numerical selection of the gift. An acknowledgment of the gift is generated by the computer system. After the numerical rating of the gift is received, the numerical rating of the gift is inserted, by the computer system, into the acknowledgment. After the numerical rating of the gift is inserted into the acknowledgment, the acknowledgment of the gift is sent, by the computer system via the web communication network, to the sender of the gift. The numerical rating of the gift is recorded, by the computer system, in the stored history of information about gifts. The stored history of information about gifts is sent, by the computer system via the web communication network, to a service of an advertiser. An advertisement that matches the data in the barcode whose selection was based on the stored history of information about gifts is received by the computer system from the service of the advertiser via the web communication network, wherein the numerical rating was used in selection of the advertisement, and wherein the received advertisement is denoted as an optimal advertisement. The optimal advertisement is presented to the recipient by the computer system via the web communication network, wherein the optimal advertisement includes a link to a web page for ordering an item identified in the web page. After the optimal advertisement is presented to the recipient, an order of the item placed via the web page is received by the computer system from the recipient via the web communication network. The item ordered by the recipient and an identification of the item is sent, by the computer system to the sender via the web communication network, as a reciprocal gift for the sender from the recipient.

DETAILED DESCRIPTION

Figure 1:
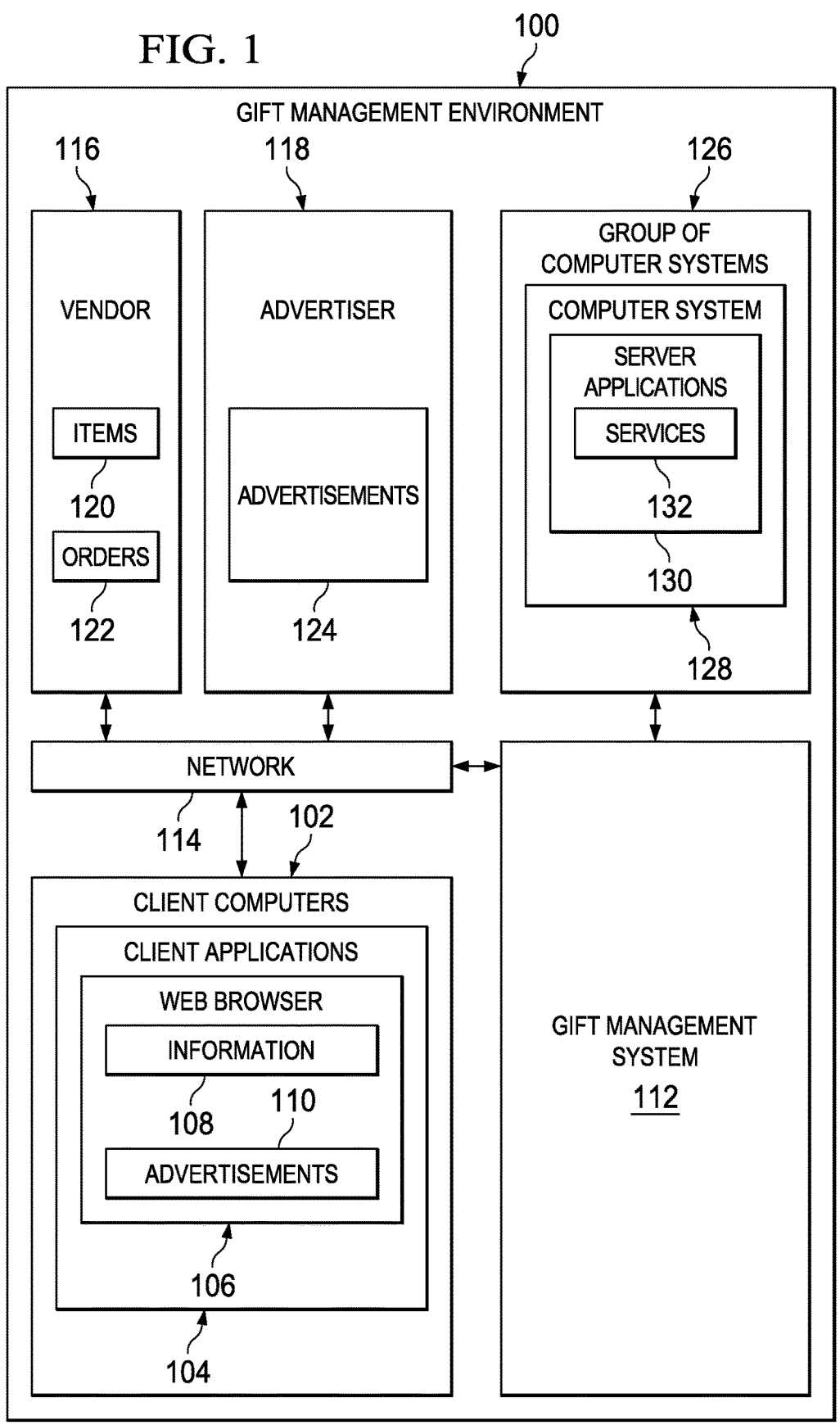
FIG. 1 is an illustration of a gift management environment for managing gifts in accordance with an illustrative embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The illustrative embodiments recognize and take into account one or more different considerations. For example, the illustrative embodiments recognize and take into account that existing items of existing vendors are available for purchase using shopping services provided by the vendors. Items as used herein are products, services, or both products and services. The items for purchase by these vendors are described using text and multimedia. For example, a user of these shopping services can browse for products and services on a vendor web site using a web browser. As another example, an owner of a portable computing device can use a vendor specific application on the device to search for and purchase particular items offered by the vendor.

The illustrative embodiments also recognize and take into account existing advertisement services of existing advertisers. For example, an owner of a web site can use advertisement services to display advertisements on a web page in the web site. Further, the owner of the web site may enter into a contract with an advertiser to display advertisements.

The illustrative embodiments further recognize and take into account that there are product and service identification systems available using one-dimensional bar codes, two-dimensional bar codes, and radio frequency identification codes. These codes are used to store information about items. For example, existing applications for existing portable computing devices are used to scan one-dimensional and two-dimensional barcodes and display information stored in the bar codes. As another example, existing applications for existing portable computing devices identify products by scanning bar codes. These applications are used for displaying information associated with products and for ordering products.

Thus, the different illustrative embodiments provide a method, apparatus, and computer program product to manage gifts. For example, one illustrative embodiment may use a process for sending an acknowledgement of a gift received to a gift sender. In one illustrative example, a gift management system may receive information about a gift from a recipient of the gift. The gift management system may generate an acknowledgment of the gift in response to receiving the information about the gift. The gift management system may then send the acknowledgement of the gift to a sender of the gift. For example, the gift management system may identify a preference for media for the sender of the gift and send the message using the preference for media for the sender.

With reference now to the figures and, in particular, with reference to FIG. 1, an illustration of gift management environment for managing gifts is depicted in accordance with an illustrative embodiment. In this illustrative example, gift management environment 100 is depicted in block diagram form.

Client applications 104 run on client computers 102 within gift management environment 100. Client applications 104 may take various forms. For example, client applications 104 may be at least one of web browser 106, a database application, a smart-phone application, and/or other suitable types of applications.

As used herein, the phrase "at least one of", when used with a list of items, means that different combinations of one or more of the listed items may be used and only one of each item in the list may be needed. For example, "at least one of item A, item B, and item C" may include, for example, without limitation, item A, or item A and item B. This example also may include item A, item B, and item C, or item B and item C. In other examples, "at least one of" may be, for example, without limitation, two of item A, one of item B, and 10 of item C; four of item B and seven of item C; and other suitable combinations.

As depicted, client applications 104, such as web browser 106 present information 108 and advertisements 110 to users of client computers 102. In these illustrative examples information 108 and advertisements 110 may be displayed in web browser 106 in a process for managing gifts using gift management system 112. As depicted, client applications 104 in client computers 102 may communicate with gift management system 112 over network 114. As also depicted, gift management system 112 and client applications 104 in client computers 102 may communicate with vendor 116 and advertiser 118 over network 114.

In these illustrative examples, vendor 116 provides users of client applications 104 access to items 120 sold by the vendor. Orders 122 for items 120 sold by a vendor may be described as items 120 from vendor 116. For example, vendor 116 may provide a service to search for and retrieve information about items 120. Vendor 116 also provides access to orders 122. For example, vendor 116 may provide a service to search for and retrieve information about orders 122 and a service to add new orders for items 120 to orders 122

As depicted, advertiser 118 provides access to advertisements 124. Advertiser 118 may provide a service to search for and retrieve advertisements 124. For example, subsequent to web browser 106 communicating with gift management system 112 through a process for managing gifts, web browser 106 may communicate with advertiser 118 to retrieve advertisements 110 from advertisements 124. In this example, advertisements 110 retrieved from advertiser 118 may include advertisements from advertisements 124 that are associated with a process in gift management system 112 for managing gifts In these illustrative examples, computer system 128 within group of computer systems 126 is one or more computers. When computer system 128 is more than one computer, the computer system may take the form of a computer cluster, group of computer systems 126, or other configurations of computer systems configured to run server applications 130. Gift management system 112 uses sever applications 130 located on computer system 128 in group of computer systems 126. A computer system is one or more computers in these illustrative examples. Server applications 130 may be any applications configured to process communications to provide services 132. Server applications 130 may be, for example, at least one of a database server, a file transfer protocol (FTP) server, a web server, a mail server, and/or other suitable types of applications.

Services 132 may include, for example, at least one of retrieving a file, retrieving a webpage, retrieving information, writing information, downloading a program, and/or other suitable types of access.

Gift management system 112 may be implemented using hardware, software, or a combination of the two. When implemented with hardware, the hardware may take the form of a circuit system, an integrated circuit, an application specific integrated circuit (ASIC), a programmable logic device, or some other suitable type of hardware configured to perform a number of operations. "A number", as used herein with reference to operations, means one or more operations. For example, "a number of items" is one or more items. With a programmable logic device, the device is configured to perform the number of operations. The device may be reconfigured at a later time or may be permanently configured to perform the number of operations. Examples of programmable logic devices may include, for example, a programmable logic array, programmable array logic, a field programmable logic array, a field programmable gate array, and/or other suitable hardware devices. Additionally, gift management system 112 may be implemented in organic components integrated with inorganic components and/or may be comprised entirely of organic components excluding a human being. When processor units are used in hardware, these processor units may be located on the same or different computers.

In these illustrative examples, gift management system 112 is configured to manage gifts using group of computer systems 126. Communications sent by client applications 104 in client computers 102 are processed by gift management system 112. In these illustrative examples, gift management system 112 is configured to use services 132 of server applications 130. For example, gift management system 112 may use a service in services 132 to search advertiser 118 to find advertisements 124. As another example, gift management system 112 may use another service in services 132 to search vendor 116 for items 120 sold by the vendor.

The illustration of gift management environment 100 in FIG. 1 is not meant to imply physical or architectural limitations to the manner in which different illustrative embodiments may be implemented. Other components in addition to and/or in place of the ones illustrated may be used. Some components may be unnecessary. Also, the blocks are presented to illustrate some functional components. One or more of these blocks may be combined and/or divided into different blocks when implemented in an illustrative embodiment.

For example, in some illustrative examples, additional gift management systems, in addition to gift management system 112, may be present within gift management environment 100. Also, although gift management system 112 is shown as a block separate from group of computer systems 126, gift management system 112 may be implemented in computer system 128. In still other examples, gift management system 112 may be implemented in one or more computer systems in group of computer systems 126.

Figure 2:
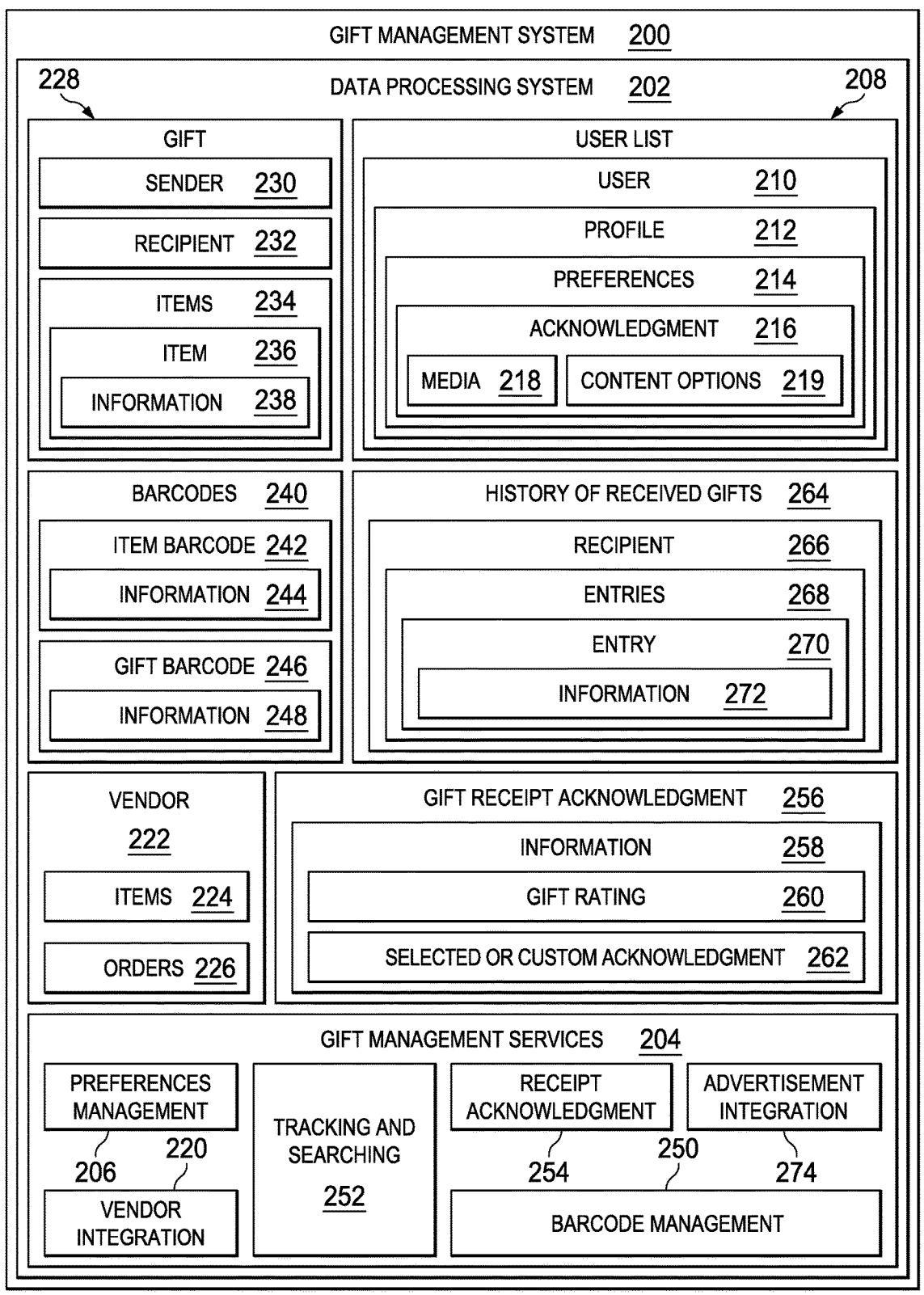
FIG. 2 is a block diagram of components involved in managing gifts in a data processing system in a gift management system in accordance with an illustrative embodiment.

Turning next to FIG. 2, a block diagram of components involved in managing gifts in a data processing system in a gift management system is depicted in accordance with an illustrative embodiment. Gift management system 200 is an example of one implementation of gift management system 112 in gift management environment 100 in FIG. 1.

In this illustrative example, data processing system 202 is present in gift management system 200. As depicted, data processing system 202 includes gift management services 204. In these illustrative examples, gift management services 204 comprise a number of services that manage gifts. Preferences management 206 is a service included in gift management services 204 for managing preferences for users in gift management system 200. User list 208 is a list of one or more users such as user 210 of gift management system 200. Profile 212 for user 210 may be an account or other record of information about users of gift management system 200. In these illustrated examples, profiles, such as profile 212, include preferences 214 for managing gifts. In particular, preferences 214 for managing gifts include acknowledgement 216 preferences for user 210 for use in a process for identifying media 218 and content options 219 of a gift receipt acknowledgement.

Media 218 is a preference for user 210 that identifies one or more types of media which user 210 prefers to receive for acknowledgement of gifts, in these illustrative examples. For example, the preference for media 218 for user 210 for receiving acknowledgement of gifts may be one or more of text messaging, physical cards, email, phone messages, multimedia messages, and any other suitable media for receiving acknowledgement of gifts.

Content options 219 is a preference for user 210 that identifies one or more pieces of information user 210 prefers to receive in an acknowledgement of a gift, in these illustrative examples. In these illustrative examples, the preference for content options 219 for user 210 for use in acknowledgements of gifts may include one or more of a canned thank you response for gift receivers to select from, a salutation and greeting style to use, a format to use, an address for user 210 where acknowledgements are to be sent, an identification of whether the gift was received and/or opened for the gift receiver to select from, an identification of particular aspects of gifts for the gift receiver to select from, an identification of an opinion of the gift for the gift receiver to select from, an identification of a purpose or use of the gift by the gift receiver for the gift receiver to select from, an identification of the occasion for which the gift was received for the gift receiver to select from, a request for gift receivers to communicate with the gift giver, and any other suitable content options for an acknowledgement of a gift.

For example, the identification of particular aspects of gifts for the gift receiver to select from may include identifying whether the gift was received damaged or not, whether the gift was viewed by the gift receiver as having high, medium, or low quality, whether the gift was of a brand that the gift receiver prefers, and any other suitable aspect of a gift that a gift receiver may wish to receive a response for from gift receivers. Also in this example, the format to use for content options 219 may include a font to use for text, a style to use for text such as formal, business, or personal, a type of multimedia to use for audio visual media, and any other suitable format information for acknowledgements. Further in this example, the gift receiver has an option to select an overall rating for the gift from 1 to 10 or any other suitable means for allowing the gift receiver to convey a qualitative opinion the gift. Still further in this example, the identification of a purpose or use of the gift by the gift receiver, for the gift receiver to select from, may include a location or type of location where the gift will be used, an explanation of how the gift will be used by the gift such as a particular purpose of the gift identified by the gift receiver and any other explanation by the gift receiver to convey the purpose or use of the gift by the gift receiver to the gift sender. The identification of the occasion for which the gift was received for the gift receiver to select from, in this example, may include an identification that the gift is for a birthday, a holiday, a wedding, a baby shower, or for any other occasion explaining the occasion for which a gift is given and received.

In these illustrative examples, vendor integration 220 is a service included in gift management services 204 for integrating vendors into gift management system 200. For example, vendor integration 220 may be configured to use vendor 222 to browse for items 224 and orders 226. As another example, vendor integration 220 may be configured to generate new orders for items 224 and send the new orders to vendor 222. In these illustrative examples, vendor integration 220 may also be configured to create a batch of orders for gifts for one or more gift recipients. "A batch", as used herein with reference to orders for gifts, means one or more orders for gifts. For example, "a batch of orders" is one or more orders.

As depicted, orders 226 for items include orders that are designated as gifts such as gift 228. In these illustrative examples, a gift, such as gift 228 may comprise an identification of the sender 230 who is sometimes referred to as gift sender; an identification of the recipient 232 who is sometimes referred to as gift recipient or gift receiver; and items 234. As depicted, items 234 comprise one or more items given by sender 230 to recipient 232 such as item 236. In these illustrative examples information 238 for item 236 presented as gift 228 to recipient 232 comprises information that identifies item 234. For example information 238 may comprise an identification of item 236 as gift 228 sent from sender 230 to recipient 232.

In these illustrative examples, barcodes 240 are used to identify items such as item 236 and gifts such as gift 228. In particular, item barcode 242 is a barcode for items, such as item 236, comprising information 244, in these illustrative examples. Still more particularly, gift barcode 246 is a barcode for gifts, such as gift 228, comprising information 248, in these illustrative examples. For example, item barcode 242 may be a one dimensional barcodes affixed to item 236. In this example, item barcode 242 may comprise information 244 identifying item 236 such as a part number from a manufacturer of item 236. As another example, gift barcode 246 may be a one or two dimensional barcode. In these illustrative examples, gift barcode 246 may affixed to a shipping label, packaging for item 236, a piece of paper including with a package in which item 236 is sent, a communication sent to recipient 232 and any other means for affixing or conveying gift barcode 246 to recipient. In these illustrative examples, gift barcode 246 may comprise information 248 that identifies item 236 as gift 228 being given by sender 230 to recipient 232. Gift barcode 246 may also comprise information identifying media 218 and content options 219 for an acknowledgement of the receipt of gift 228.

As depicted, barcode management 250 is a service included in gift management services 204 for scanning, retrieving, and generating barcodes such as barcodes 240. For example, when sender 230 orders a gift using vendor integration 220, gift barcode 246 may be generated by barcode management 250 service. In this example, barcode management 250 may use preferences 214 in a profile for sender 230 such as profile 212 for user 210 to generate gift barcode 246. Gift barcode 246 may take various forms. For example, gift barcode 246 may be a universal product code (UPC) barcode, a quick response (QR) bar code, of some other suitable type of barcode. Particularly in this example, information 248 stored in generated gift barcode 246 may include media 218 and content options 219 for an acknowledgement of the receipt of gift 228 based on preferences 214 in profile 212. Still more particularly, when sender 230 orders a gift, gift barcode 246 may be generated by barcode management 250 in response to a command from sender 230. In these illustrative examples, barcode management 250 may also be used by vendors, gift senders, and gift recipients to generate an image associated with generated gift barcode 246. The generated image for gift barcode 246 may be stored, displayed, printed, sent, and encoded in any suitable format for presenting gift barcode 246.

In these illustrative examples, tracking and searching 252 is a service included in gift management services 204 for browsing to locate information about gifts, such as gift 228. For example, a user may use tracking and searching 252 to search for gifts sent by sender 230 and gifts received by recipient 232. As another example, a user may use tracking and searching 252 through vendor integration 220 to search for items sent by sender 230 and items received by recipient 232 that may or may not have been identified as a gift such as gift 228. For example, a user of gift management system 200 may have received an item but cannot locate gift barcode 246. In this example, the user of gift management system 200 may use tracking and searching 252 to attempt to locate information about the item to identify if item 236 was sent as a gift, such as gift 228. In the case where item 236 is identified as gift 228, tracking and searching 252 presents the user with information 248.

In the case where item 236 is not identified as a gift in gift management system 200, tracking and searching 252 presents the user with options to identify item 236 as gift 228 in gift management system 200. For example, a user of gift management system 200 having received item 236 may choose to use gift management services 204 to subsequently add gift 228 into gift management system 200 as a received gift of item 236. In this example, the gift recipient having added gift 228 into gift management system 200 may further choose to associate his own preferences 214 with gift 228 for acknowledgement 216 of receipt of item 236 as gift 228. Further in this example, the gift recipient having added gift 228 into gift management system 200 may create new preferences 214 in a new profile 212 for gift sender or gift receiver for use with gift 228. For example, gift receiver may decide to use preferences 214 for his own profile instead of a profile for gift sender. In this example, a gift receiver may decide to use his own preferences for a particular gift or for a batch of gifts.

In these illustrative examples, receipt acknowledgement 254 is a service included in gift management services 204 for acknowledging receipt of gifts, such as gift 228. As depicted, subsequent to receiving gift 228, a user of gift management system 200, such as gift recipient 232, may use receipt acknowledgement 254 to identify gift 228. For example, a user of gift management system 200 may use a scan of gift barcode 246 to identify gift 228. As depicted, gift receipt acknowledgment 256 may be generated by receipt acknowledgement 254. In these illustrative examples, gift receipt acknowledgment 256 may comprise information 258, such as gift rating 260 and selected or custom acknowledgement 262. As discussed above, information 258 in gift receipt acknowledgment 256 is chosen by preferences 214 for content options 219 of gift sender 230. For example, a user of gift management system 200 having used receipt acknowledgement 254 to identify gift 228 may subsequently use receipt acknowledgement 254 to select answers for content options 219 for gift receipt acknowledgement 256. In this example, content options 219 selected by gift sender 230 are presented to gift recipient 232. Further in this example, gift recipient 232 provides the requested information for content options 219 selected by gift sender 230. Still further in this example, when gift recipient 232 has provided the requested information for content options 219 selected by gift sender 230, receipt acknowledgement 254 sends gift receipt acknowledgment 256 to gift sender 230 using media 218.

As depicted, subsequent to receipt acknowledgement 254 sending gift receipt acknowledgment 256 to gift sender 230, receipt acknowledgement 254 records the sending of gift receipt acknowledgment 256 as entry 270 in entries 268 for recipient 266 in history of received gifts 264. As depicted, each entry 270 in entries 268 comprises information 272. In these illustrative examples, information 272 for entry 270 may comprise information 248 in gift barcode 246, information provided by gift recipient 232 for content options 219 selected by gift sender 230, and any other information suitable for keeping a record of received gifts.

In these illustrative examples, advertisement integration 274 is a service included in gift management services 204 for integrating advertisers into gift management system 200. In these illustrative examples, advertisement integration 274 retrieves advertisements from advertisers for presentation to users by gift management services 204 in gift management system 200. For example, subsequent to a use of receipt acknowledgement 254 advertisement integration 274 may retrieve an advertisement from an advertiser that is suitable for presentation to a current user of receipt acknowledgement 254. In these illustrative examples, advertisement integration 274 may use a service of advertiser 118 in FIG. 1 to retrieve advertisements 124 in FIG. 1 from advertiser 118.

In these illustrative examples, the advertisements retrieved by advertisement integration 274 may be identified as optimal advertisements based on an association between the advertisement and information 248 in gift barcode 246. The advertisements retrieved by advertisement integration 274 may also be based on an association between the advertisement and ratings for gifts entered by gift receivers, an association between the advertisement and wish-lists provided by gift receivers, and any other suitable association with advertisements and information about gift receivers and gift senders. For example, advertisement integration 274 may retrieve advertisements 124 that match information 248 in gift barcode 246 by sending one or more portions of information 248 in gift barcode 246 to a service of advertiser 118 for retrieving advertisements that match information. As another example, advertisement integration 274 may retrieve advertisements 124 that match information 248 in gift barcode 246, wherein the advertisement provides a link to a web page or other shopping service for ordering an additional item associated with gift barcode 246. In this example, when gift recipient 232 receives gift 228, gift recipient 232 may select the advertisement. Further in this example, subsequent to selecting the advertisement gift recipient 232 may then be presented with a web page or other shopping service for ordering a reciprocal gift for gift sender 230.

Additionally in these illustrative examples, advertisement integration 274 may keep a record of advertisements that have been presented to users of gift management services. The record of advertisements that have been presented to users of gift management services may be used to generate a bill for advertising to the advertiser and as a record of proof that the advertisements were presented.

The illustration of gift management system 200 in FIG. 2 is not meant to imply physical or architectural limitations to the manner in which different illustrative embodiments may be implemented. Other components in addition to and/or in place of the ones illustrated may be used. Some components may be unnecessary. Also, the blocks are presented to illustrate some functional components. One or more of these blocks may be combined and/or divided into different blocks when implemented in an illustrative embodiment.

For example, in some illustrative examples, additional services, in addition to the services shown gift management services 204, may be present within gift management system 200. For example a service to search for and retrieve information about items 120 in FIG. 1, in vendor 116 in FIG. 1, as well as a service to search for and retrieve advertisements 124 in FIG. 1, and in advertiser 118 in FIG. 1 may be included in gift management system 200.

As another example, tracking and searching 252 may also automate a process for notifying gift sender 230 regarding any gifts for which gift sender 230 has not yet received a gift acknowledgment, a thank you note, or a reciprocal gift. For example, a user may configure tracking and searching 252 to automatically search for gifts sent by sender 230 that are not followed by a gift acknowledgment, a thank you note, or a reciprocal gift in history of received gifts 264. In this example, subsequent to identifying an issue that a gift that did not receive a gift acknowledgment, a thank you note, or a reciprocal gift, tracking and searching 252 generates and sends a report about the issue to sender 230 using preference for media 218 for sender 230.

Figure 3:
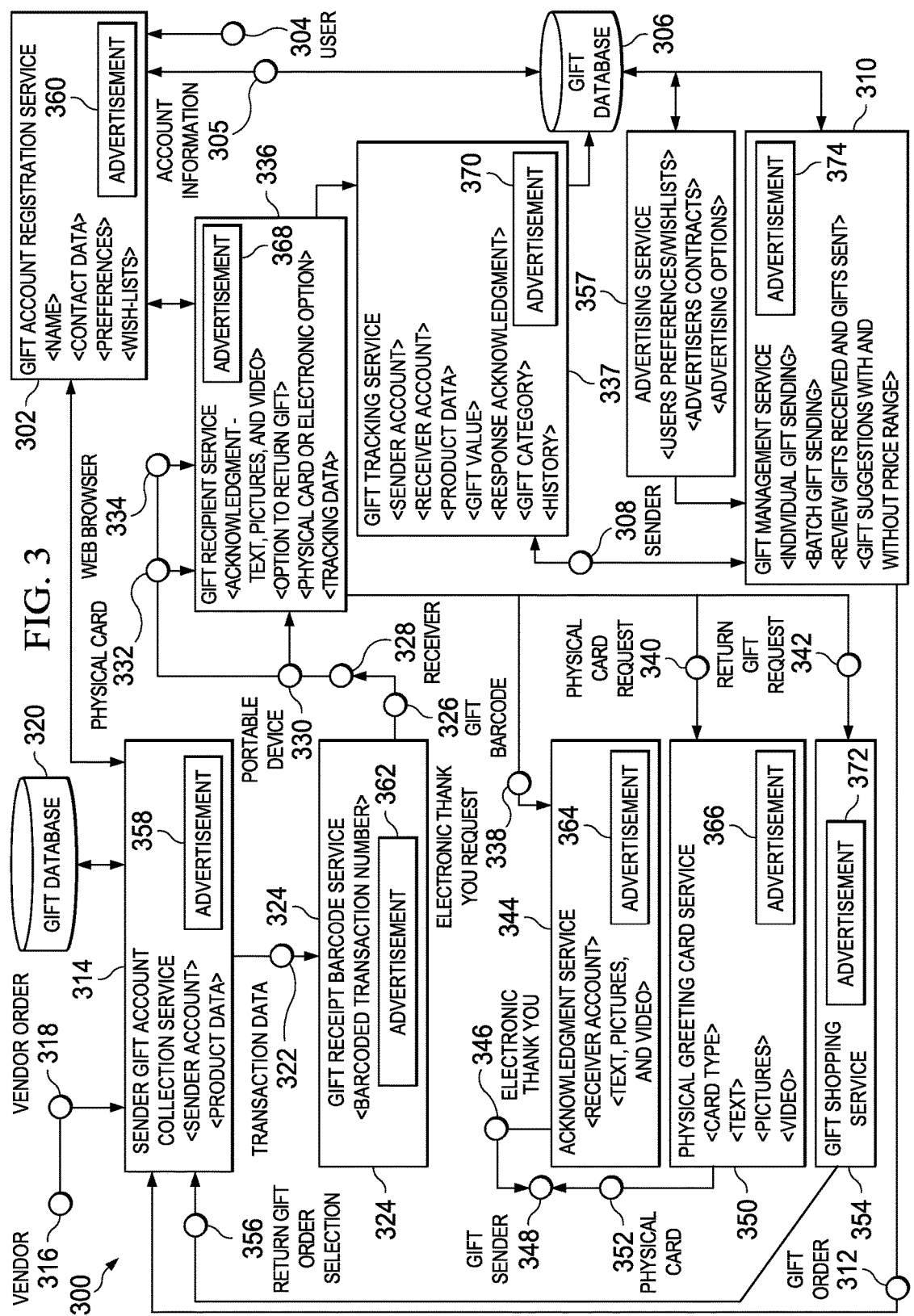
FIG. 3 is an illustration of data flow in a process for managing gifts using gift management services in accordance with an illustrative embodiment.

With reference now to FIG. 3, an illustrative example of data flow in a process for managing gifts using gift management services is depicted in accordance with an illustrative embodiment. Data flow 300 in FIG. 3 may be implemented in gift management system 200 in FIG. 2. In particular, data flow 300 in the process for managing gifts may be implemented in software, hardware, or a combination of the two using gift management services 204 in data processing system 202 in FIG. 2.

In this illustrative example, gift account registration service 302 is an example of a service in gift management services 204 in FIG. 2. For example, gift account registration service 302 may provide preferences management 206 services in FIG. 2 to create preferences for a user, such as user 210. In this illustrative example, account information 305 is an example of profile 212 for user 210 in FIG. 2. As depicted, account information 305 is created a user such as user 304 and comprises a name, contact data, preferences, wish-lists, and other information suitable for gift accounts. In this illustrative example, account information 305 is stored in gift database 306.

As depicted, gift sender 308 uses gift management service 310 to create gift order 312. Gift management service 310 is an example of vendor integration 220 in FIG. 2. In this illustrative example, gift management service 310 generates individual orders for gifts, such as gift order 312, and batch orders for gifts. For example, gift order 312 may include information describing an item to be given to a recipient from gift sender 308.

Sender gift account collection service 314 is another example of vendor integration 220 in this illustrative example. Sender gift account collection service 314 receives orders for gifts from vendor 316, such as vendor order 318, and orders for gifts from gift management service 310, such as gift order 312. In this illustrative example, responsive to receiving an order for a gift, sender gift account collection service generates transaction data 322 for the order comprising sender account information and product data about item being given to the recipient.

Gift receipt barcode service 324 is an example of barcode management 250 in FIG. 2. Responsive to receiving transaction data 322, gift receipt barcode service 324 generates gift barcode 326 which is an example of gift barcode 246 in FIG. 2.

In this illustrative example, when gift receiver 328 receives a gift that includes gift barcode 326, gift receiver provides information in digital form to portable device 330, or in physical form on physical card 332, or by communicating through web browser 334.

As depicted, gift recipient service receives information from gift receiver from portable device 330, or via physical card 332, or through communications from web browser 334. In this illustrative example, the information received may include an acknowledgement the gift was received comprising text, pictures, and video about the gift; a selection of an option to return the gift; a selection of an option to send a physical card to the gift sender; and a selection of an option to send an electronic thank you to the gift sender. As depicted responsive to receiving the information, gift recipient service 336 sends the information in the form of tracking data to gift tracking service 337. As also depicted responsive to receiving tracking data, gift tracking service 337 stores tracking data in gift database 306. As further depicted, responsive to receiving the information, gift recipient service 336 determines from the information whether to generate and send electronic thank you request 338 from receiver 328, whether to generate and send physical card request 340 from receiver 328, and whether to generate and send return gift request 342 from receiver 328.

In this illustrative example, subsequent to gift recipient service 336 determining from the information to generate and send electronic thank you request 338 from receiver 328, electronic thank you request 338 is generated and sent to acknowledgement service 344. As depicted, acknowledgement service 344 receives electronic thank you request 338 comprising text, pictures, and video provided from gift receiver 328 as acknowledgement of the receipt of the gift identified by gift barcode 326. Responsive to receiving electronic thank you request 338, acknowledgement service 344 identifies contact data for gift sender 348 in account information 305. Acknowledgement service 344 then generates electronic thank you 346 using the text, pictures, and video provided from gift receiver 328, and sends electronic thank you 346 to gift sender 348 using the identified contact data for gift sender 348. For example, even if gift receiver 328 does not know any personal information about gift sender 348, gift receiver 328 may still respond with a thank you, such as electronic thank you request 338. In this example, gift receiver 328 never has to know personal information about gift sender, because acknowledgement service 344 identifies contact data for gift sender 348 in account information 305.

In this illustrative example, subsequent to gift recipient service 336 determining from the information to generate and send physical card request 340 from receiver 328, physical card request 340 is generated and sent to physical greeting card service 350. As depicted, physical greeting card service 350 receives physical card request 340 comprising text, pictures, and video provided from gift receiver 328 as acknowledgement of the receipt of the gift identified by gift barcode 326. Responsive to receiving physical card request 340, physical greeting card service 350 identifies contact data for gift sender 348 in account information 305. Physical greeting card service 350 then generates physical card 352 using the text, pictures, and video provided from gift receiver 328 and sends physical card 352 to gift sender 348 using the identified contact data for gift sender 348.

In this illustrative example, subsequent to gift recipient service 336 determining from the information to generate and send return gift request 342 from receiver 328, return gift request 342 is generated and sent to gift shopping service 354. As depicted, subsequent to gift shopping service 372 receiving return gift request 342 a user such as gift receiver 328 then uses gift shopping service 372 to select another gift as return gift order selection 356. In this illustrative example, return gift return gift order selection 356 is sent to sender gift account collection service as a replacement order for the gift that gift receiver 328.

Advertising service 357 is an example of advertisement integration 274 in FIG. 2. As depicted, advertising service 357 retrieves advertisements from advertisers for presentation of advertisements to users of services. In this illustrative example, advertisements 358 and advertisement 374 are examples of advertisements presented to users of services while using services in data flow 300.

Figure 4:
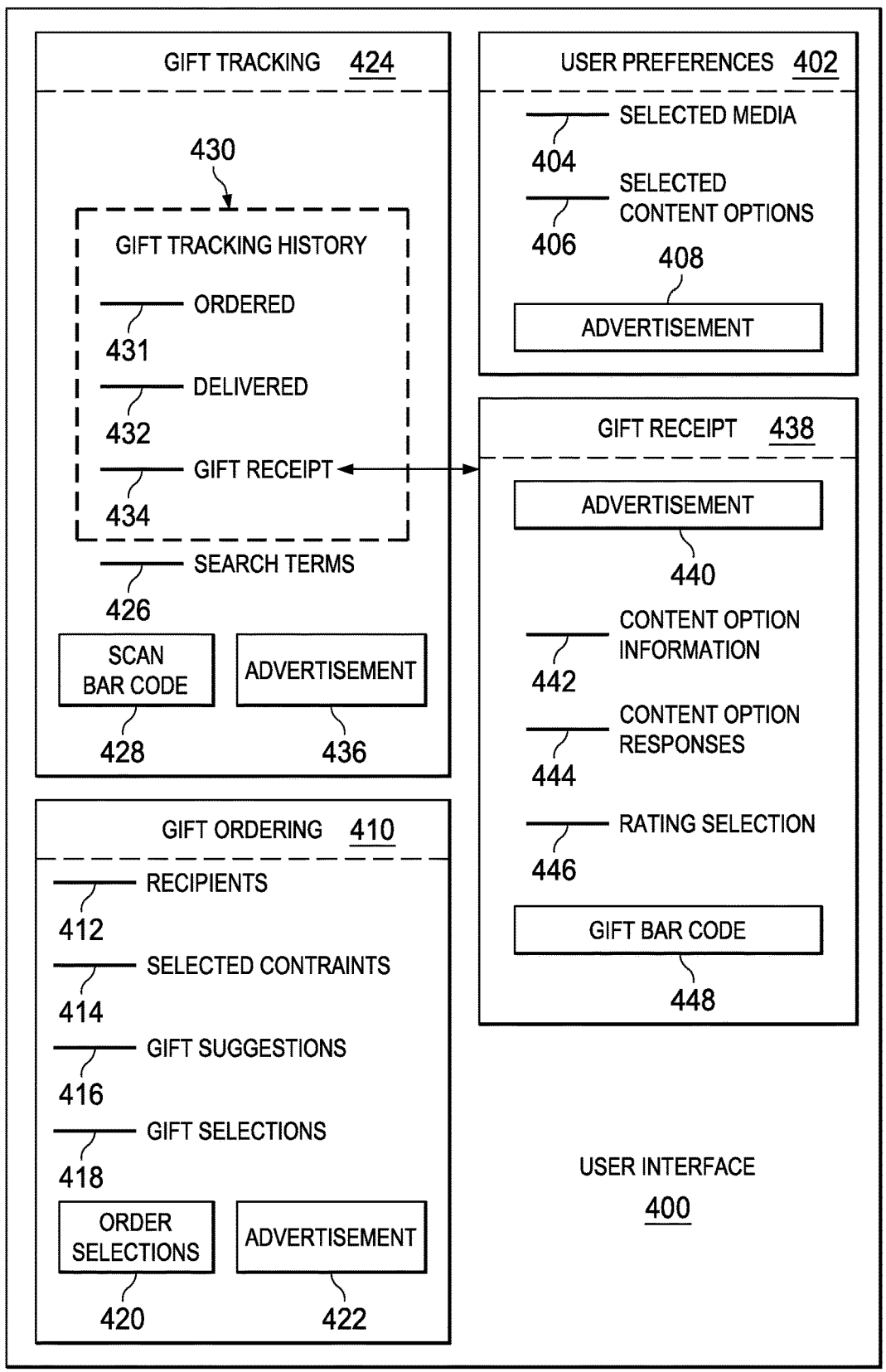
FIG. 4 is an illustration of a user interface for managing gifts in accordance with an illustrative embodiment.

With reference now to FIG. 4, an illustration of a user interface for managing gifts is depicted in accordance with an illustrative embodiment. User interface 400 is an illustrative example of one implementation of a graphical user interface for gift management services 204 in data processing system 202 in FIG. 2. In other illustrative examples, user interface 400 may also be any type of user interface suitable for presenting the contents of user interface 400 to one or more users.

In this illustrative example, user interface 400 includes user interface windows of services in gift management services 204 in FIG. 2. User preferences 402 is a window present in user interface 400 for entering and modifying preferences, such as preferences 214 in FIG. 2. In this illustrative example, user preferences 402 is a user interface for preferences management 206 in FIG. 2. As depicted, window for user preferences 402 includes selected media 404, selected content options 406, and advertisement 408. Selected media 404 is an example of media 218 in FIG. 2. Selected content options 406 is an example of content options 219 in FIG. 2.

Gift ordering 410 is a window present in user interface 400 for ordering gifts, such as gift 228 in FIG. 2. In this illustrative example, gift ordering 410 is a user interface for vender integration 220 in FIG. 2. As depicted, the window for gift ordering 410 comprises recipients 412, selected constraints 414, gift suggestions 416, gift selections 418, order selections 420, and advertisement 422. Each recipient in recipients 412 is an example of recipient 232 in FIG. 2. Selected constraints 414 describe limits for a gift when shopping, such as a budgetary limit on overall spending for gifts, and a limit on spending for a particular gift. Gift suggestions 416 are suggestions for gifts that match selected constraints 414 and may be well received by a recipient based on a history of gifts received by the recipient. In these illustrative examples, gift suggestions 416 may be automatically made by a process in vendor integration 220 for identifying gifts that match selected constraints 414 and the history of gifts received by the recipient. Gift selections 418 are gifts that have been selected by a user to be purchased for gift recipients. Order selections 420 is a user interface button for initiating an order with a vendor for the gifts in gift selections 418. In these illustrative examples, gift selections 418 may be automatically made by a process in vendor integration 220 for selecting gifts for gift recipients that match selected constraints 414. For example, selected constraints 414 for use in automatically sending automatically suggested items may include a budget constraint for a particular occasion for a set of one or more gift recipients. In this example, one or more gifts may be automatically sent as a batch of gifts to the set of one or more recipients associated with the occasion, wherein each gift sent is selected automatically based on matching the budget constraint, the history of gifts received by the recipient, and any other suitable constraints.

Gift tracking 424 is a window present in user interface 400 for tracking orders. In this illustrative example, gift tracking 424 is a user interface for tracking and searching 252 in FIG. 2. As depicted, the window for gift tracking 424 comprises search terms 426, scan bar code 428, gift tracking history 430, and advertisement 436. Gift tracking history 430, includes information about gifts that have been ordered 431, delivered 432, and for which there is a gift receipt 434. Search terms 426 are entered by a user of tracking and searching 252 to browse for orders of gifts. Search terms 426 may include information about gifts, an identification of a gift sender, an identification of a gift receiver, and any other information suitable for locating orders for gifts. As depicted scan bar code 428 is a button that executes a process for scanning a barcode such as item barcode 242 in FIG. 2 or gift barcode 246 in FIG. 2. For example, the process for scanning the barcode may scan a user selected barcode to identify information in the barcode and then place the identified information into search terms 426. Subsequent to entering search terms 426, a query retrieves information matching search terms 426 and uses the retrieved information to populate gift tracking history 430. A user may select other buttons, not shown, that allow the user to view additional information about the information populated in gift tracking history 430 and also to sort the information in gift tracking history 430. For example, a user may select gift receipt 434 to be presented with a window for gift receipt 434 that comprises information about gift receipt 434.

Gift receipt 438 is a window present in user interface 400 for viewing and creating gift receipt acknowledgements. In this illustrative example, gift receipt 438 is a user interface for receipt acknowledgement 254 in FIG. 2. As depicted, the window for gift receipt 438 comprises advertisement 440, content option information 442, content option responses 444, rating selection 446, and gift barcode 448. Content option information 442 comprises information selected to be presented to gift recipient in selected content options 406. Content option responses 444 comprise selections made by gift recipient for selected content options 406. For example, rating selection 446 is an example of a content option by a gift sender for gift recipient to rate the gift.

Figure 5:
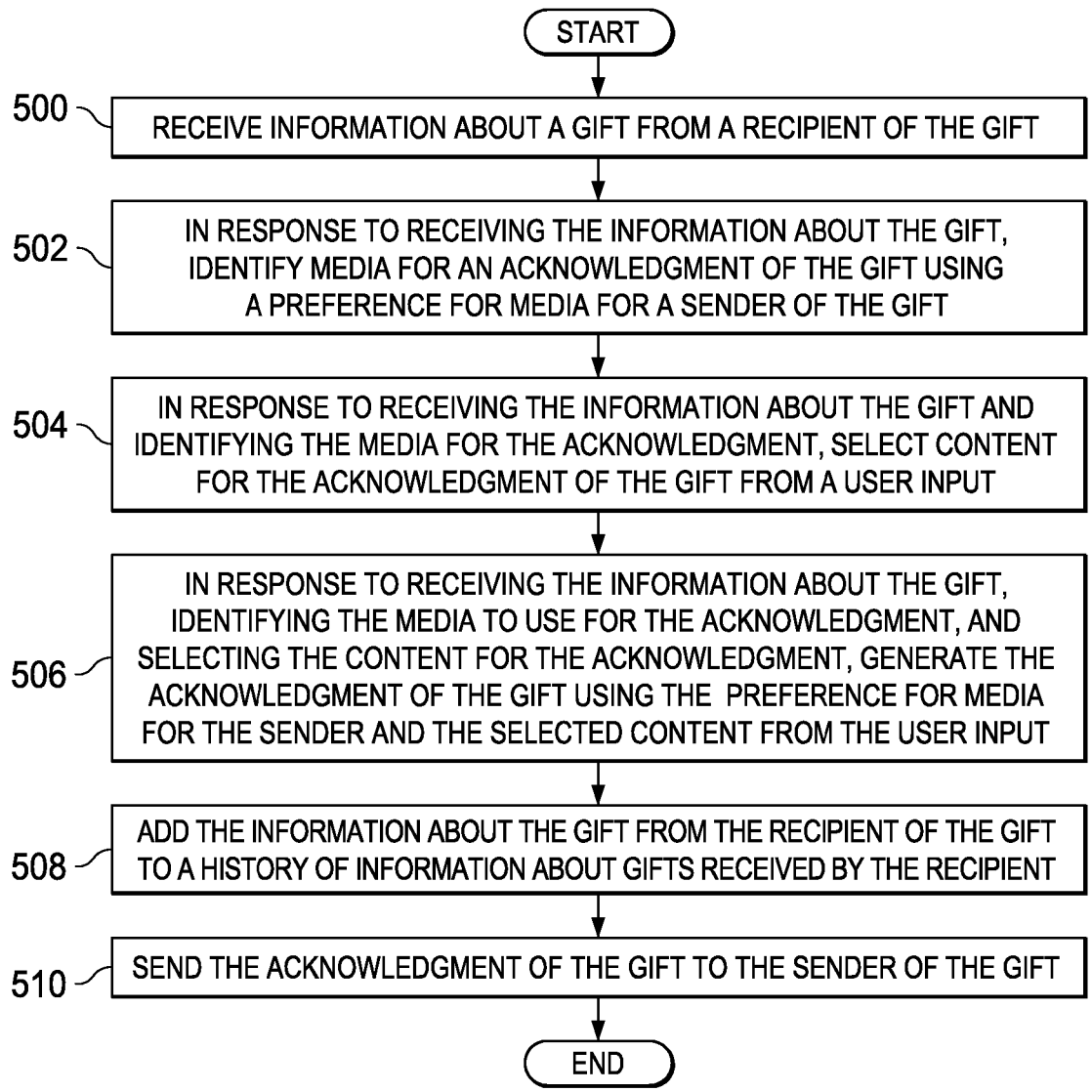
FIG. 5 is a flow chart of a process for managing receipt of gifts in accordance with an illustrative embodiment.

Turning next to FIG. 5, an illustrative example of a flowchart of a process for managing receipt of gifts is depicted in accordance with an illustrative embodiment. The steps in FIG. 5 may be implemented in gift management system 200 in FIG. 2. In particular, the steps in the process for managing receipt of gifts may be implemented in software, hardware, or a combination of the two using gift management services 204 in data processing system 202 in FIG. 2.

The process begins by receiving information about a gift from a recipient of the gift (step 500). In this illustrated process, the recipient is an example of recipient 232 in FIG. 2. The gift for which the information is provided is an example of gift 228 in FIG. 2. For example, the information received about the gift from the recipient may include an identification of gift 228 using a scan of gift barcode 246 in FIG. 2.

In response to receiving the information about the gift, the process identifies media for an acknowledgment of the gift using a preference for media for a sender of the gift (step 502). For example, the process may use information about gift 228, such as sender 230 in FIG. 2, to identify media 218 in FIG. 2 in preferences 214 in FIG. 2 for sender 230.

Responsive to receiving the information about the gift and identifying the media for the acknowledgment, the process selects content for the acknowledgment of the gift from a user input (step 504). For example, the process may select content from content options 219 in FIG. 2 using user input provided by the user to a service in gift management services 204 in FIG. 2, such as receipt acknowledgement 254 service in FIG. 2.

In response to receiving the information about the gift, identifying the media to use for the acknowledgment, and selecting the content for the acknowledgment, the process generates the acknowledgment of the gift using the preference for media for the sender and the selected content from the user input (step 506). In this illustrated process, the generated acknowledgment of the gift is an example of gift receipt acknowledgement 256 in FIG. 2, and the selected content is an example of information 258 in FIG. 2.

As depicted, the process adds the information about the gift from the recipient of the gift to a history of information about gifts received by the recipient (step 508). The history of information about gifts received by the recipient, in this illustrated process, is an example of history of received gifts 264 in FIG. 2. The process then sends the acknowledgment of the gift to the sender of the gift (step 510) with the process terminating thereafter.

Figure 6:
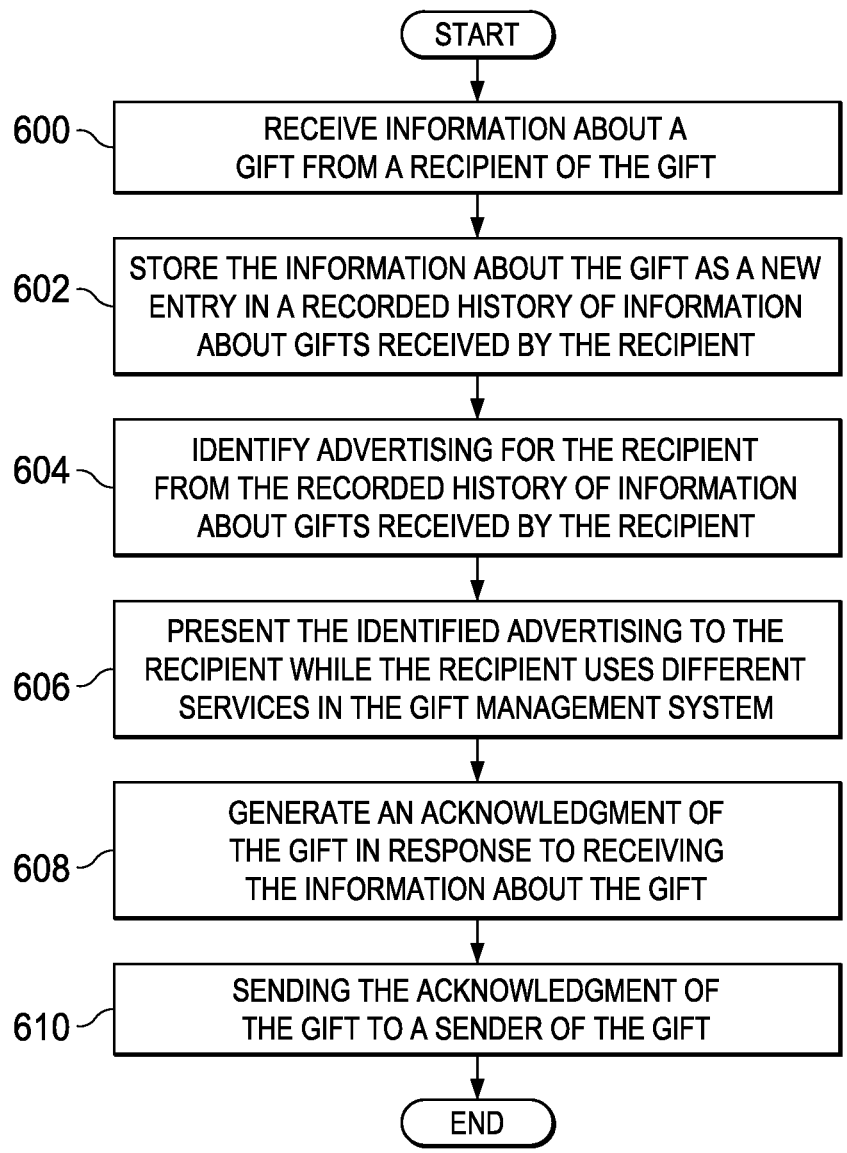
FIG. 6 is a flow chart of a process for presenting advertising while managing gifts in accordance with an illustrative embodiment.

Turning next to FIG. 6, an illustrative example of a flowchart of a process for presenting advertising while managing receipt of gifts is depicted in accordance with an illustrative embodiment. The steps in FIG. 5 may be implemented in may be implemented in gift management system 200 in FIG. 2. In particular, the steps in the process for presenting advertising while managing receipt of gifts may be implemented in software, hardware, or a combination of the two using gift management services 204 in data processing system 202 in FIG. 2.

The process begins by receiving information about a gift from a recipient of the gift (step 600). The process stores the information about the gift as a new entry in a recorded history of information about gifts received by the recipient (step 602). The process next identifies advertising for the recipient from the recorded history of information about gifts received by the recipient (step 604). As depicted, the process presents the identified advertising to the recipient while the recipient uses different services in the gift management system (step 606). The process generates an acknowledgment of the gift in response to receiving the information about the gift (step 608). The process then sends the acknowledgment of the gift to a sender of the gift (step 610) with the process terminating thereafter.

Figure 7:
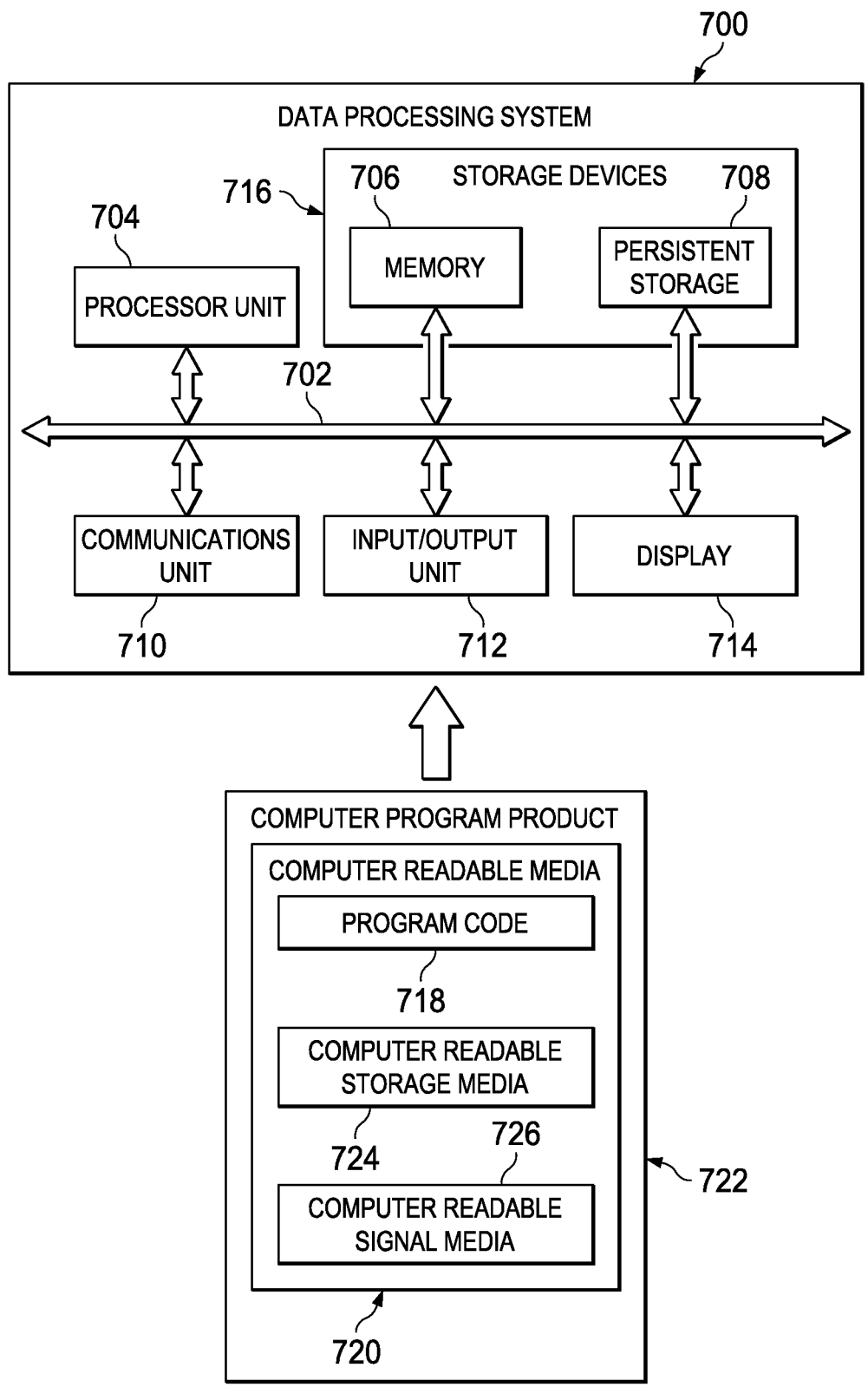
FIG. 7 is an illustration of a data processing system in accordance with an illustrative embodiment.

Turning now to FIG. 7, an illustration of a data processing system is depicted in accordance with an illustrative embodiment. Data processing system 700 may be used to implement to implement components of FIG. 1, such as gift management system 112, computer system 128, vendor 116, advertiser 118, and client computers 102. Data processing system 700 also may be include program code, hardware circuits or both that operate to perform one or more steps in the illustrative embodiments.

In this illustrative example, data processing system 700 includes communications framework 702, which provides communications between processor unit 704, memory 706, persistent storage 708, communications unit 710, input/output (I/O) unit 712, and display 714. In these examples, communications frame work 704 may be a bus system.

Processor unit 704 serves to execute instructions for software that may be loaded into memory 706. Processor unit 704 may be a number of processors, a multi-processor core, or some other type of processor, depending on the particular implementation. A number, as used herein with reference to an item, means one or more items. Further, processor unit 704 may be implemented using a number of heterogeneous processor systems in which a main processor is present with secondary processors on a single chip. As another illustrative example, processor unit 704 may be a symmetric multi-processor system containing multiple processors of the same type.

Memory 706 and persistent storage 708 are examples of storage devices 716. A storage device is any piece of hardware that is capable of storing information, such as, for example, without limitation, data, program code in functional form, and/or other suitable information either on a temporary basis and/or a permanent basis. Storage devices 716 may also be referred to as computer readable storage devices in these examples. Memory 706, in these examples, may be, for example, a random access memory or any other suitable volatile or non-volatile storage device. Persistent storage 708 may take various forms, depending on the particular implementation.

For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708.

Communications unit 710, in these examples, provides for communications with other data processing systems or devices. In these examples, communications unit 710 is a network interface card. Communications unit 710 may provide communications through the use of either or both physical and wireless communications links.

Input/output unit 712 allows for input and output of data with other devices that may be connected to data processing system 700. For example, input/output unit 712 may provide a connection for user input through a keyboard, a mouse, and/or some other suitable input device. Further, input/output unit 712 may send output to a printer. Display 714 provides a mechanism to display information to a user.

Instructions for the operating system, applications, and/or programs may be located in storage devices 716, which are in communication with processor unit 704 through communications framework 702. In these illustrative examples, the instructions are in a functional form on persistent storage 708. These instructions may be loaded into memory 706 for execution by processor unit 704. The processes of the different embodiments may be performed by processor unit 704 using computer implemented instructions, which may be located in a memory, such as memory 706.

These instructions are referred to as program code, computer usable program code, or computer readable program code that may be read and executed by a processor in processor unit 704. The program code in the different embodiments may be embodied on different physical or computer readable storage media, such as memory 706 or persistent storage 708.

Program code 718 is located in a functional form on computer readable media 720 that is selectively removable and may be loaded onto or transferred to data processing system 700 for execution by processor unit 704. Program code 718 and computer readable media 720 form computer program product 722 in these examples. In one example, computer readable media 720 may be computer readable storage media 724 or computer readable signal media 726. Computer readable storage media 724 may include, for example, an optical or magnetic disk that is inserted or placed into a drive or other device that is part of persistent storage 708 for transfer onto a storage device, such as a hard drive, that is part of persistent storage 708. Computer readable storage media 724 also may take the form of a persistent storage, such as a hard drive, a thumb drive, or a flash memory, that is connected to data processing system 700. In some instances, computer readable storage media 724 may not be removable from data processing system 700. In these examples, computer readable storage media 724 is a physical or tangible storage device used to store program code 718 rather than a medium that propagates or transmits program code 718. Computer readable storage media 724 is also referred to as a computer readable tangible storage device or a computer readable physical storage device. In other words, computer readable storage media 724 is a media that can be touched by a person.

Alternatively, program code 718 may be transferred to data processing system 700 using computer readable signal media 726. Computer readable signal media 726 may be, for example, a propagated data signal containing program code 718. For example, computer readable signal media 726 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 718 may be downloaded over a network to persistent storage 708 from another device or data processing system through computer readable signal media 726 for use within data processing system 700. For instance, program code stored in a computer readable storage medium in a server data processing system may be downloaded over a network from the server to data processing system 700. The data processing system providing program code 718 may be a server computer, a client computer, or some other device capable of storing and transmitting program code 718.

The different components illustrated for data processing system 700 are not meant to provide architectural limitations to the manner in which different embodiments may be implemented. The different illustrative embodiments may be implemented in a data processing system including components in addition to or in place of those illustrated for data processing system 700. Other components shown in FIG. 7 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 704 may take the form of a hardware unit that has circuits that are manufactured or configured for a particular use. This type of hardware may perform operations without needing program code to be loaded into a memory from a storage device to be configured to perform the operations.

For example, when processor unit 704 takes the form of a hardware unit, processor unit 704 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 718 may be omitted because the processes for the different embodiments are implemented in a hardware unit.

In still another illustrative example, processor unit 704 may be implemented using a combination of processors found in computers and hardware units. Processor unit 704 may have a number of hardware units and a number of processors that are configured to run program code 718. With this depicted example, some of the processes may be implemented in the number of hardware units, while other processes may be implemented in the number of processors.

In another example, a bus system may be used to implement communications framework 702 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of more devices that transmit data, receive data, or transmit and receive data. A communications unit may be, for example, a modem or a network adapter, two network adapters, or some combination thereof. Further, a memory may be, for example, memory 706, or a cache, such as found in an interface and memory controller hub that may be present in communications framework 702.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Thus, illustrative embodiments of the present invention provide a computer implemented method, data processing system, and computer program product for managing gifts.

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, the method comprising:

receiving, by a computer system via a web communication network, information about a gift from a recipient of the gift, wherein the information about the gift is within a barcode included on or in a package in which the gift is sent to the recipient, wherein said receiving the information about the gift results from a scan of the barcode by a portable computing device of the computer system, wherein the information about the gift identifies the gift as being given by a sender to the recipient and identifies types of media desired by the sender for receiving acknowledgement of gifts;

after said receiving the information about the gift, storing, by the computer system, the information about the gift as a new entry in a stored history of information about gifts previously received by the recipient, said stored history being stored in the computer system;

after said storing the information about the gift, identifying, by the computer system, advertising for the recipient from the stored history of information about gifts received by the recipient;

after said identifying advertising for the recipient, presenting, by the computer system via the web communication network, the advertising to the recipient;

receiving, by the computer system via the web communication network, a numerical rating of the gift, said numerical rating having been selected by the recipient via a rating selection region in a graphical user interface (GUI);

generating, by the computer system, an acknowledgment of the gift;

after said receiving the numerical rating of the gift, inserting, by the computer system, the numerical rating of the gift into the acknowledgment;

after said inserting the numerical rating of the gift into the acknowledgment, sending, by the computer system via the web communication network, the acknowledgment of the gift to the sender of the gift;

recording, by the computer system, in the stored history of information about gifts, the numerical rating of the gift;

sending, by the computer system via the web communication network, the stored history of information about gifts to a service of an advertiser;

receiving, by the computer system from the service of the advertiser via the web communication network, an advertisement whose selection was based on the stored history of information about gifts, wherein the numerical rating was used in selection of the advertisement, said received advertisement being denoted as an optimal advertisement;

presenting, by the computer system via the web communication network, the optimal advertisement to the recipient, said optimal advertisement including a link to a web page for ordering an item identified in the web page;

after said presenting the optimal advertisement to the recipient, receiving, by the computer system from the recipient via the web communication network, an order of the item placed via the web page; and sending, by the computer system to the sender via the web communication network, the item ordered by the recipient and an identification of the item as a reciprocal gift for the sender from the recipient.

2. The method of claim 1, the method further comprising:

inserting, by the computer system, into the acknowledgment: a location where the gift will be used and an explanation of how the gift will be used by the recipient.

3. The method of claim 1, the method further comprising:

selecting, by the computer system, the gift based on the stored history of information about gifts previously received by the recipient.

4. The method of claim 1, wherein the computer system comprises an application specific integrated circuit (ASIC) that performs the method for managing gifts, wherein the ASIC is customized for implementing the method for managing gifts and not for general purpose use.

5. An apparatus, comprising: a processor unit, a computer readable storage device, memory, and first program code stored in the computer readable storage device for execution by the processor unit via the memory, the first program code comprising:

program code for receiving information, via a web communication network, about a gift from a recipient of the gift, wherein the information about the gift is within a barcode included on or in a package in which the gift is sent to the recipient, wherein said receiving the information about the gift results from a scan of the barcode by a portable computing device of a computer system, wherein the information about the gift identifies the gift as being given by a sender to the recipient and identifies types of media desired by the sender for receiving acknowledgement of gifts;

program code for storing, after the information about the gift has been received, the information about the gift as a new entry in a stored history of information about gifts previously received by the recipient, said stored history being stored in the computer system;

program code for, after the information about the gift has been stored, identifying advertising for the recipient from the stored history of information about gifts received by the recipient;

program code for presenting, via the web communication network after the advertising has been identified for the recipient, the advertising to the recipient;

program code for receiving, via the web communication network, a numerical rating of the gift, said numerical rating having been selected by the recipient via a rating selection region in a graphical user interface (GUI);

program code for generating an acknowledgment of the gift;

program code for inserting, after the numerical rating of the gift has been received, the numerical rating of the gift into the acknowledgment;

program code for, after the numerical rating of the gift has been inserted into the acknowledgment, sending, via the web communication network, the acknowledgment of the gift to the sender of the gift;

program code for recording, by the computer system, in the stored history of gift information about gifts, the numerical rating of the gift;

program code for sending, via the web communication network, the gift information to a service of an advertiser;

program code for receiving, via the web communication network, from the service of the advertiser, an advertisement whose selection was based on the stored history of information about gifts, wherein the numerical rating, in the gift information, was used in selection of the advertisement, said received advertisement being denoted as an optimal advertisement;

program code for presenting, via the web communication network, the optimal advertisement to the recipient, said optimal advertisement including a link to a web page for ordering an item identified in the web page;

program code for, after the optimal advertisement has been presented to the recipient, receiving, via the web communication network, from the recipient, an order of the item placed via the web page; and program code for sending, via the web communication network, to the sender, the item ordered by the recipient and an identification of the item as a reciprocal gift for the sender from the recipient.

6. The apparatus of claim 5, wherein the apparatus comprises an application specific integrated circuit (ASIC) that is customized for implementing said managing gifts and not for general purpose use, wherein the ASIC comprises the processor unit, the memory, and the computer readable storage device.

* * * * *